Dec. 30, 1958   H. D. KEEFER ET AL   2,866,643
MERRY-GO-ROUND
Filed March 25, 1955

INVENTOR.
HERBERT D. KEEFER
LOUIS H. THOMPSON
BY
HIS ATTORNEYS

United States Patent Office 2,866,643
Patented Dec. 30, 1958

2,866,643

MERRY-GO-ROUND

Herbert D. Keefer and Louis H. Thompson, Dayton, Ohio, assignors to National Amusement Device Co., Dayton, Ohio, a corporation of Ohio Application March 25, 1955, Serial No. 496,858

4 Claims. (Cl. 272—43)

This invention relates to a hobby horse for movement upon a movable support, such as a merry-go-round.

An object of the invention is to provide a driving mechanism and a supporting mechanism for a hobby horse, wherein the hobby horse is driven so as to have movement simulating a gallop, which driving mechanism is dependable, efficient, inexpensive to produce and which, at the same time, produces very desirable movement.

Other objects and advantages reside in the construction of parts, the combination thereof and the mode of operation, as will become more apparent from the following description.

In the drawings Figure 1 is a top plan view of a portion of a merry-go-round, shown rather schematically.

Figure 1:
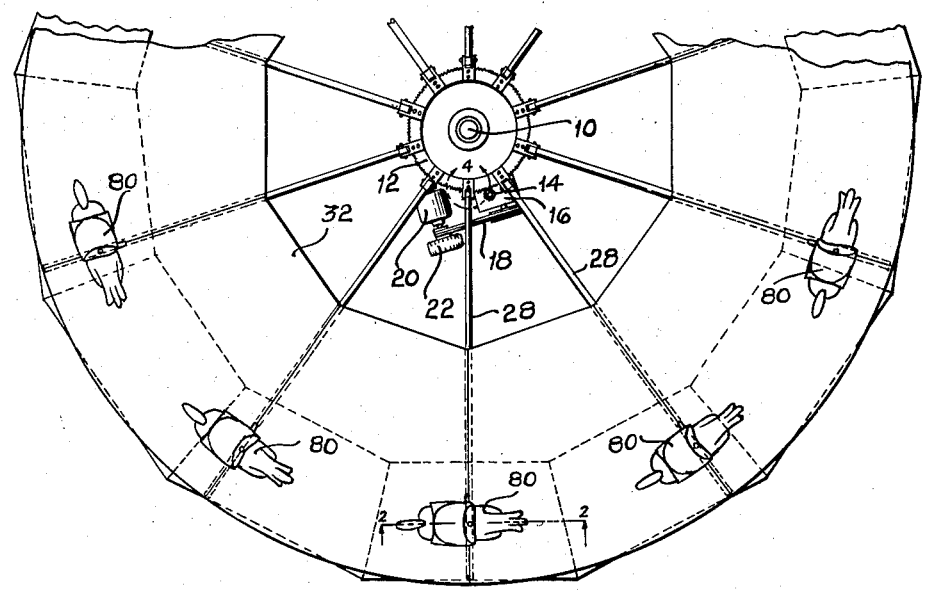
Figures 2, 3:
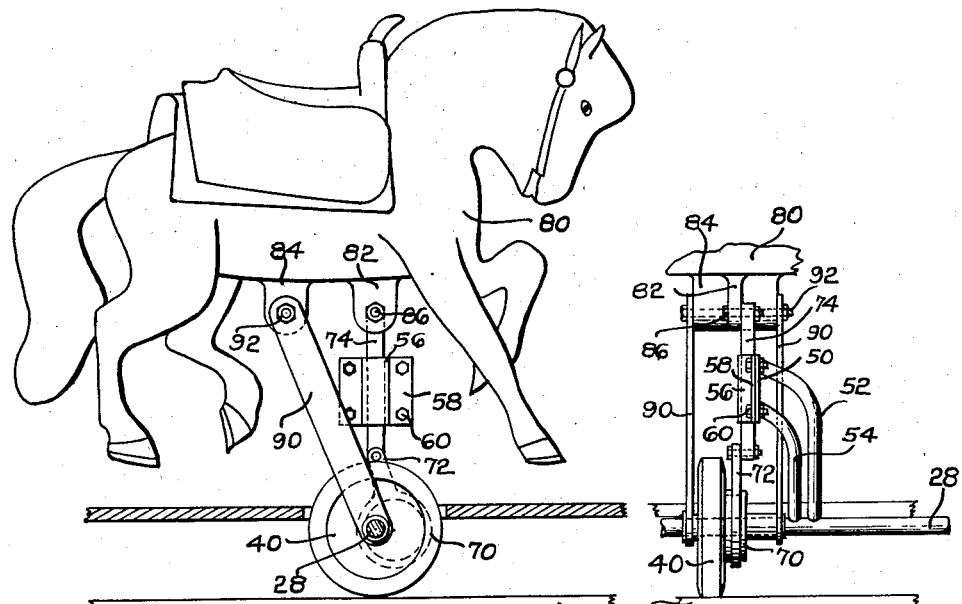
Figure 2 is a fragmentary sectional view, taken substantially on the line 2—2 of Figure 1, drawn to a much larger scale.
Figure 3 is a fragmentary, detail view of the actuating mechanism, looking in the direction of movement thereof.
Figures 4, 5:
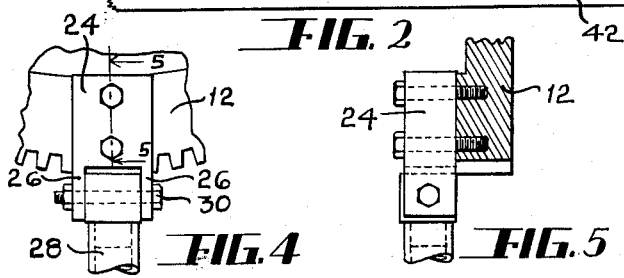
Figure 4 is an enlarged fragmentary view of one of the radiating arms used for transmitting movement from the center gear to the merry-go-round proper.
Figure 5 is a fragmentary cross sectional view of the gear, taken substantially on the line 5—5 of Figure 4, and the coupler for coupling the radiating arm to the gear.

Only a very brief description will be made of the merry-go-round, excepting the portions pertaining to the invention disclosed herein. A central hub 10 has journalled thereon a rather large gear 12 driven by a pinion 14 through a gear box 16 actuated by a V-belt 18 driven by an electric motor 20 through suitable clutch mechanism 22. The gear 12 supports a plurality of coupling units 24. Each coupling unit 24 terminates in furcations 26, having pivotally mounted thereon a radiating arm or rod 28 held in position by means of suitable bolts 30. The arms 28 have mounted thereon a platform 32. Near the outer end of each rod or arm 28 is mounted a rubber tired wheel 40 for supporting the outer ends of the rods 28 and the platform 32 upon a track 42. The platform 32 is made up of sections loosely resting upon the arms or rods 28. The platform is provided with openings through which the wheels 40 and parts associated therewith project. The wheels 40 are rotatably mounted upon the rods 28, so that as the gear 12 is driven, the wheels 40 travel on the track 42. The pivotal connection with the rods 28 and the coupling unit 24 to the gear 12 results in an operative structure, even though the track 42 may not be perfectly level and the hub 10 may not be perfectly normal to the plane of the platform 32 and the track 42. This results in a merry-go-round that is easily assembled and that operates even though the hub may not be perfectly plumb and the track 42 level.

Each of the radiating arms or rods 28 has mounted thereon a guide plate 50 by means of a pair of arcuate tubular members 52 and 54 welded to the plate 50 and to the rod 28. The plate 50 has attached thereto a channel or guide member 56 provided with outwardly directed flanges 58 secured to the plate 50 by means of a plurality of bolts 60.

The wheel 40 is provided with an eccentric cam 70 mounted on one side of the wheel. This eccentric cam actuates a crank arm 72 pivotally connected to a link 74 guided by the channel member 56 and the plate 50, so as to cause the link 74 to move along a substantially vertical path.

A hobby horse 80 is provided with downwardly directed lugs 82 and 84. The link 74 is pivotally attached to the lug 82 by a bolt 86. A pair of braces or links 90, pivotally mounted upon the rod or arm 28, is also pivotally attached to the lug 84 by means of a bolt 92. From this it can readily be seen that as the merry-go-round rotates, the wheel 40 rotates on the rod 28 and with it the eccentric 70, actuating the crank 72 so as to reciprocate the link 74 to raise and lower the lug 82 and with it the hobby horse 80. Due to the fact that the distance between the bolts 86 and 92 remains constant and the braces 90 are pivotally mounted upon the rod or arm 28, it may readily seen that the bolt 92 will move through a semi-arcuate path having a radius of curvature terminating at the center of the rod 28. This movement results in a galloping effect when riding the merry-go-round. Each of the horses of the merry-go-round is provided with saddles and bridles, the saddles being shown schematically, without showing the stirrups, et cetera.

Although the prefererd embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. A hobby horse and a mounting for said horse for effecting a galloping movement of said horse in association with a merry-go-round, said mounting comprising a support member, said support member including a radially extending horizontal arm secured to the hub of said merry-go-round and adapted to be driven circumferentially by said hub, a wheel journalled for rotation on said arm in spaced relation from said hub, said wheel carrying said arm for rotation about the axis defined by said arm, a track fixedly positioned concentric with the hub of the merry-go-round, said track engaging and rotating said wheel upon circumferential movement of said arm about said hub, a cam eccentrically mounted upon said wheel for rotation therewith, a crank arm journalled for rotation upon said cam so as to be actuated reciprocally thereby, a first link pivotally engaging said crank arm at the lower end thereof and pivotally engaging the underside of said horse at the upper end thereof, means carried by said support member providing a guide for said link for restricting the movement of said link to vertical movement, a second link pivotally engaging the underside of said horse in spaced relation to said first link at the upper end thereof, and means pivotally supporting the lower end of said second link at a fixed position on said support member.

2. A hobby horse and a mounting for said horse for effecting a galloping movement of said horse in association with a merry-go-round according to claim 1, wherein the radially extending horizontal arm secured to the hub of said merry-go-round and adapted to be driven circumferentially by said hub is pivotally attached to the hub on a horizontally disposed pivot permitting vertical movement of the arm about said pivot to accommodate variations in elevation of the track.

3. A hobby horse and a mounting for said horse for effecting a galloping movement of said horse in association with a merry-go-round according to claim 1, wherein said horizontal arm consists of a shaft forming an axle for said wheel.

4. A hobby horse and a mounting for said horse for effecting a galloping movement of said horse in association with a merry-go-round according to claim 1, wherein the means carried by said support member providing a guide for said link includes a guide plate supported by a pair of arcuate tubular members fixedly secured to the arm, the plate having attached thereto a guide member for guiding the link vertically.

References Cited in the file of this patent

UNITED STATES PATENTS

| | | |
|---|---|---|
| 372,296 | Blinkhorn | Nov. 1, 1887 |
| 1,370,385 | Unger | Mar. 1, 1921 |
| 1,627,570 | Melcher | May 10, 1927 |
| 1,745,719 | Sellner | Feb. 4, 1930 |
| 1,759,170 | Sherry | May 20, 1930 |
| 2,637,554 | Terreson | May 5, 1953 |

FOREIGN PATENTS

| | | |
|---|---|---|
| 39,130 | Germany | Apr. 12, 1887 |
| 555 | Great Britain | 1891 |